United States Patent
Gundrum et al.

[11] Patent Number: 5,891,334
[45] Date of Patent: Apr. 6, 1999

[54] FILTER CARTRIDGE RETAINING ASSEMBLY

[75] Inventors: Robert R. Gundrum, Sheboygan; Michael D. Steinhardt, Kiel; Robert G. Schumacher, II, Sheboygan Falls, all of Wis.

[73] Assignee: Plymouth Products, Inc., Sheboygan, Wis.

[21] Appl. No.: 878,664

[22] Filed: Jun. 19, 1997

[51] Int. Cl.⁶ ..................................... B01D 35/30
[52] U.S. Cl. ................. 210/232; 210/321.83; 210/433.1; 210/440; 210/450; 210/453; 210/455
[58] Field of Search ................ 210/232, 321.87, 210/440, 445, 450, 453, 455, 479, 321.83, 443, 444, 458, 433.1; 220/293, 297, 298, 300, 319, 627, 737, 740

[56] References Cited

U.S. PATENT DOCUMENTS

| | | | |
|---|---|---|---|
| 2,333,890 | 11/1943 | Russell | 220/300 |
| 2,991,885 | 7/1961 | Gutkowski | 210/444 |
| 5,082,557 | 1/1992 | Grayson et al. | 210/109 |
| 5,114,572 | 5/1992 | Hunter et al. | 210/232 |

*Primary Examiner*—Matthew O. Savage
*Attorney, Agent, or Firm*—Andrus, Sceales, Starke & Sawall

[57] ABSTRACT

A retaining ring assembly for a reverse osmosis filter cartridge includes a removable retaining ring inserted into the cartridge housing after insertion of the cartridge, the retaining ring including a demountable locking connection with the housing. When the housing is subsequently removed to replace the cartridge, the retaining ring forces the cartridge from its tightly sealed connection to the end cap or header, allowing the cartridge to be easily removed with the housing. Preferably, the housing includes a special brine ring adapted to cooperate with a conventional cartridge brine seal, the brine ring providing connection for the retaining ring and defining with the housing a brine flow passage.

1 Claim, 2 Drawing Sheets

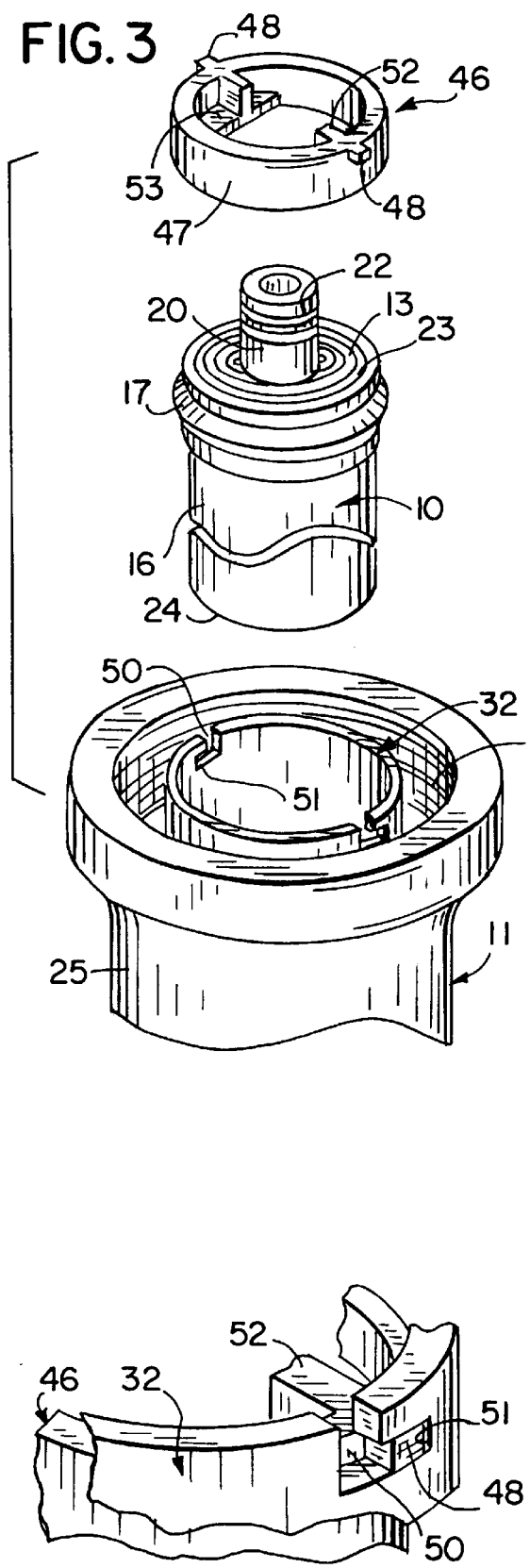
FIG. 3
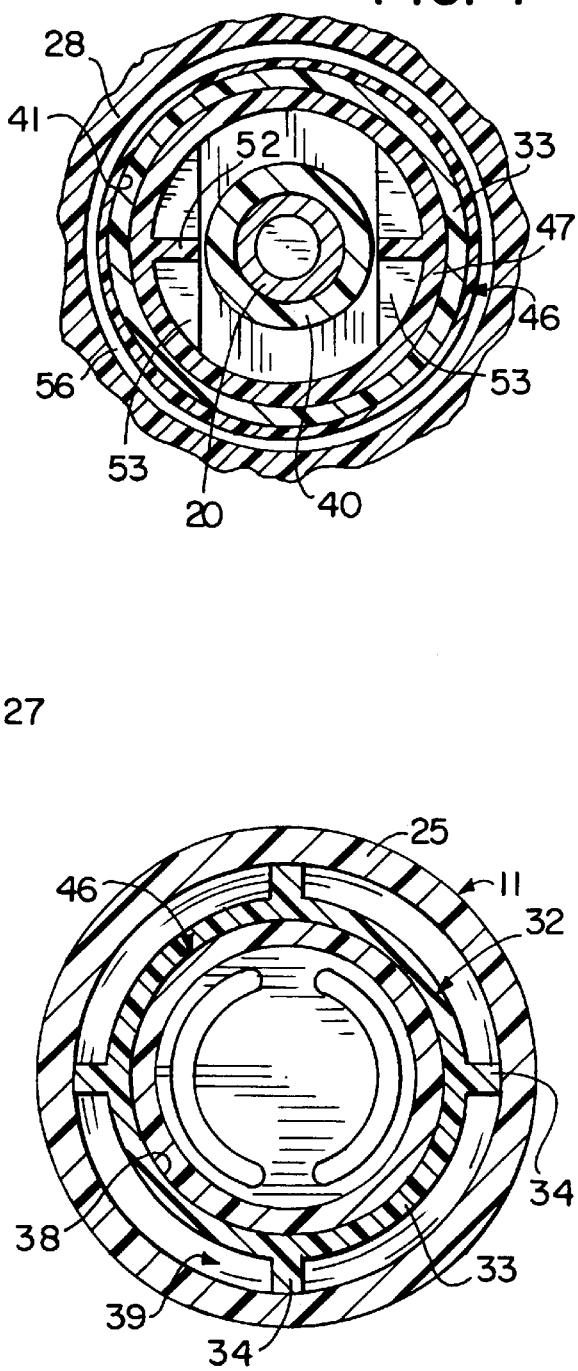
FIG. 4
FIG. 5
FIG. 6

FILTER CARTRIDGE RETAINING ASSEMBLY

BACKGROUND OF THE INVENTION

The present invention pertains to replaceable cartridge type filters and, more particularly, to such a filter utilizing a reverse osmosis cartridge with an assembly for retaining the cartridge in the housing when it is removed for replacement.

Replaceable cartridge filters have been in used in water treatment systems for many years. A typical filter unit of this type utilizes an elongate, generally cylindrical housing or sump which is open at one end for the receipt of a replaceable filter cartridge, and the cartridge and the housing are demountably attachable to an enclosing end cap. The end cap may be a unitary cover or part of a header system for control of fluid flow into and out of the cartridge. The filter cartridge may include any of several well known kinds of filter media, and multiple housings and associated filter cartridges may be attached to a common header system for the serial removal of a wide variety of both suspended and dissolved contaminants from a liquid stream. The media used in filter cartridges varies widely, depending upon the contaminant to be removed, and such media include granular particulate materials, coarse sintered blocks, paper and plastic filters, and semi-permeable membranes.

One type of semi-permeable membrane or reverse osmosis (RO) filter cartridge utilizes a membrane which is spirally wrapped around a porous center tube and enclosed in an impervious cylindrical outer wrap. The opposite ends of the cartridge are open, with one of the ends receiving untreated incoming water under pressure and in which most dissolved solids are separated as the water passes through the semipermeable membrane and flows radially toward the porous center tube. The treated water (or membrane permeate) passes along the center tube to an outlet end. The untreated water containing the concentrated dissolved solids (known as the concentrate and commonly referred to as brine) passes out of the opposite end of the membrane cartridge. Such a cartridge typically includes a brine seal which is interposed between the outer cartridge wrap and the inside wall of the cartridge housing to prevent untreated water from bypassing the cartridge and mixing directly with the brine. However, in certain RO cartridge assemblies, such as an assembly in which the brine seal is located at one end of the element and the outlet for the brine flow is located at the opposite end of the element and housing, a volume of stagnant water is created between the OD of the element and the ID of the housing. This pool of stagnant water is not flushed by continuous flow through the element and therefore provides an area for the propagation of bacteria which, in turn, may lead to fouling by migration to active areas of the RO membrane surface. Depending on how a system is designed, the potential problem of pools of stagnant water, either on the untreated water side or the brine water side of the RO element, is a problem in all residential RO systems which utilize a brine seal.

The product water outlet in the typical RO cartridge comprises a cylindrical neck, which is typically an extension of the center product water tube, and is received in a cylindrical sleeve which forms part of the housing end cap and contains a product water discharge port. The interface between cartridge neck and the sleeve on the cap must be tightly sealed and one typical seal arrangement comprises a pair of axially spaced O-rings which are seated in annular grooves in the cartridge neck and which engage the inside wall of the sleeve in the cap. RO filter cartridges of the foregoing general type are shown, for example, in U.S. Pat. Nos. 4,645,601, 5,002,664, 5,082,557 and 5,266,195.

A typical application for a reverse osmosis membrane filter cartridge of the foregoing general types is in purifying tap water for drinking. As indicated, such a filter cartridge is commonly utilized in a series arrangement with other replaceable cartridge filters which remove from the untreated water other suspended and dissolved solids which cannot be removed by membrane separation. Such water treatment units are commonly mounted beneath a sink on which the tap is located or in another confined and typically somewhat restricted space. A number of problems relating to the replacement of filter cartridges generally and RO filter cartridges particularly have arisen with the use of these systems.

In multi-cartridge systems which typically include three units, manufacturer's like to utilize identical filter housings for simplicity in manufacturing and inventory, as well as to maintain a uniform product appearance. However, certain filter cartridges and often RO membrane cartridges, do not fit well in housings designed for other types of filter cartridges used in these multi-cartridge systems. As a result, special adapters, special covers, or special non-standard housings may have to be used. A specialized and relatively complex housing end cap is shown, for example, in the above identified U.S. Pat. No. 5,082,557. A specialized, non-standard housing is shown in U.S. Pat. No. 5,266,195.

Because RO filter cartridges must handle and provide an interface for three liquid flows, namely, untreated water, treated water, and brine, some means for accommodating the additional liquid flow, not present in other kinds of filter cartridges, must be utilized. In U.S. Pat. No. 5,002,664, the brine flow is accommodated by a special connection through the bottom of the RO cartridge housing. This complicates the construction of the unit, as well as the ease of filter replacement.

Another problem unique to filter cartridges having a neck on one end for the treated water outlet, which includes an O-ring seal arrangement engaging the cylindrical ID of a sleeve in the end cap, is that the tight seal which results causes the filter cartridge to hang up in the end cap when the housing is unscrewed from the end cap for removal and filter cartridge replacement. The filter housing must be slid downwardly along the entire length of the filter cartridge before the cartridge can be independently removed from its sealed attachment to the end cap or header. When operating in a confined space, such as under a kitchen sink, this lack of head space may present a serious obstacle to ease of replacement. This problem is addressed and solved in U.S. Pat. No. 4,645,601 by providing an integral cartridge and housing which are removed together. Such an arrangement, though convenient, is extremely uneconomical because the housing must be replaced each time the filter cartridge is replaced.

BRIEF SUMMARY OF THE INVENTION

In accordance with the present invention, a cartridge retaining assembly is used to hold the filter cartridge in place within the housing and to retain it in place when the housing is unscrewed or otherwise removed from the end cap or header for cartridge replacement. In an embodiment particularly adapted for small diameter RO filter cartridges, the cartridge retaining ring cooperates with a supplemental brine ring which adapts a conventional filter housing to receive a smaller diameter RO cartridge.

The cartridge retaining ring assembly of the present invention is particularly adapted for use with a filter cartridge of the type having a smaller diameter neck on one end which defines a liquid flow passage, and which cartridge is in use inserted into and contained in an open-ended housing. The housing is demountably and sealably attached to an enclosing end cap. The end cap, which may comprise a part of a multi-unit header, includes an integral sleeve which surrounds the neck of the cartridge in the attached position, and provides therewith a liquid-tight seal. The retaining ring assembly includes a retaining ring which is adapted to be placed on the end of the filter cartridge in the housing and around the cartridge neck. The retaining ring includes means for manually locking the ring to the housing to hold the cartridge in a fixed position within the housing. Thus, when the housing is demounted from the end cap, the filter cartridge neck is engaged by the retaining ring and pulled from the integral sleeve, against the resistance of the water-tight sealed interface, and the housing, cartridge and retaining ring are removable together.

The assembly, particularly when adapted to accommodate a conventional RO membrane cartridge, includes a brine ring which is attached to the inner wall of the housing adjacent the open end thereof. The brine ring has an outer wall which defines, with the cylindrical inner wall of the housing, a flow passage for one of the liquid fractions. The brine ring also has a cylindrical inner wall which is sealingly engaged by a brine seal on the cartridge element when the cartridge is inserted into the housing. The retaining ring locking means comprises interengaging connectors on the retaining ring and the brine ring. In its preferred construction, the brine ring comprise a tubular cylindrical sleeve, and the interengaging connectors comprise a pair of diametrically opposite slots in one end of the tubular sleeve and a pair of cooperating lugs on the retaining ring which are adapted to be received in the slots.

BRIEF DESCRIPTION OF THE SEVERAL VIEWS OF THE DRAWINGS

FIG. 3 is an exploded view of the upper portion of the housing, the replaceable filter cartridge, and the retaining ring assembly of the present invention;

FIG. 4 is a horizontal section through the filter unit taken on line 4—4 of FIG. 2;

FIG. 5 is a horizontal section taken through the unit on line 5—5 of FIG. 2; and FIG. 6 is a partial perspective view of the interengaging connection between the retaining ring and brine ring of the retaining assembly of the present invention.

DETAILED DESCRIPTION OF THE PREFERRED EMBODIMENT

Figure 1:
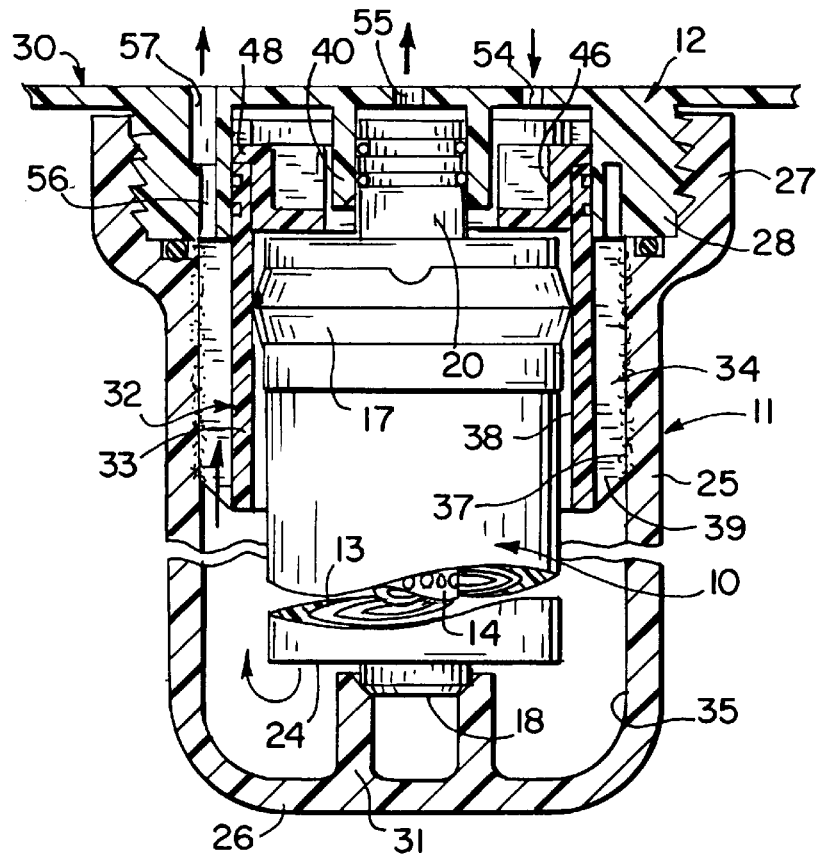
FIG. 1 is a vertical section through a filter cartridge showing the retaining ring assembly of the present invention in its operative installed position.
Figure 2:
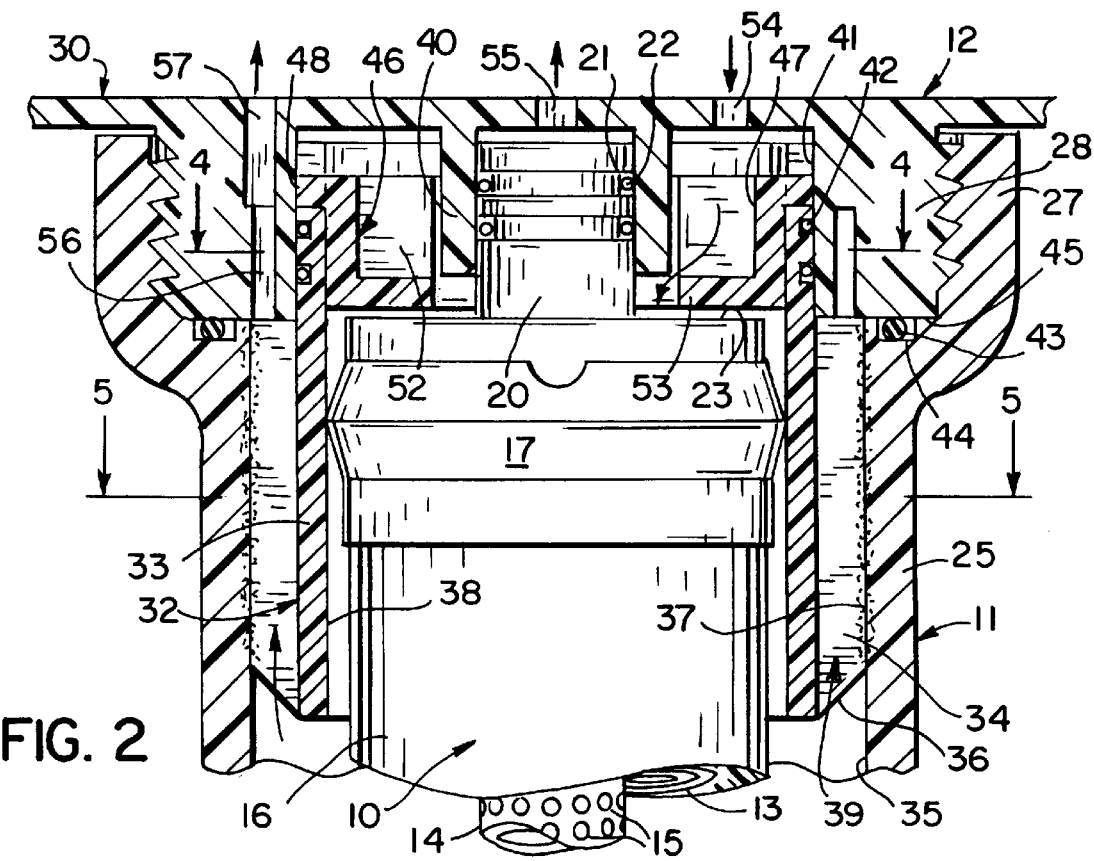
FIG. 2 is an enlarged detail of the upper portion of FIG. 1.

Referring to FIGS. 1 and 2, a replaceable filter cartridge 10 is contained inside a tubular housing 11 which is removably attached to an upper end cap 12. The particular filter cartridge 10 shown in the drawings, utilizes a semi-permeable membrane to remove dissolved solids from untreated water by reverse osmosis. The construction of the filter cartridge 10 is in all respects conventional and is of the type presently available from several manufacturers. The cartridge includes an interior spirally wound membrane 13 which may include an intermediate separator layer, all of which is shown schematically in FIGS. 1 and 2. The membrane 13 is wound around a central hollow product water tube 14, which extends the length of the cartridge 10, and is provided in its outer surface with a pattern of through holes 15. The membrane is closed by an impervious outer wrap 16 which may be plastic or any other suitable material. The upper end of the cartridge is provided with a brine seal 17 attached to the cylindrical outer wrap 16. The lower end of the cartridge has a central extension 18, and the opposite end has a small diameter cylindrical neck 20 both of which preferably comprise integral extensions of the interior product water tube 14. The neck 20 is provided with a pair of axially spaced annular grooves 21 in which are received sealing O-rings 22. The opposite axial ends of the cartridge 10, adjacent, respectively, the cylindrical neck 20 and the extension 18, are open to expose the membrane 13 to accommodate an incoming flow of untreated water and an outgoing flow of brine. The brine flow comprises the high volume concentrate of water and dissolved solids which does not pass through the semi-permeable membrane. Although membrane filter cartridges of the type used in this invention may accommodate untreated water and brine water flows through either end, the cartridge in the present embodiment is oriented with the untreated water inlet 23 on the upper end and the brine water outlet 24 on the lower end.

The filter housing 11 is of conventional molded plastic construction, which includes an elongated cylindrical side wall 25 and a closed bottom end 26. The open, upper end of the housing has an enlarged diameter end portion 27 with a threaded ID adapted to engage a correspondingly threaded OD on a cylindrical boss 28, which depends downwardly from the underside of the end cap 12. In this embodiment, the end cap comprises the lower portion of a multi-unit header which, as indicated previously, may accommodate several different types of filter units, each of which is contained in a housing similar to housing 11, threadably attached to a similar cylindrical boss 28. As is well known in the industry, the remainder of the header (not shown) includes a pattern of passageways and valves to accommodate the flow of water through the system.

Referring also to FIG. 3, the filter cartridge 10 is inserted vertically downwardly into the open upper end of the housing 11 until the center tube extension 18 on the lower end of the cartridge engages and rests upon the upper edge of a cartridge support 31 on the bottom end 26 of the housing. To provide a sealing surface for the cartridge brine seal 17, the housing 11 is provided with a brine ring 32. The brine ring is made of suitable plastic separately from the housing, but is permanently attached thereto. The brine ring 32 comprises a generally cylindrical tubular sleeve 33 to the outer wall of which are attached four equally spaced axial ribs 34. As shown in FIGS. 1 and 2, the axial ribs 34 are shorter in length than the tubular sleeve 33 and terminate somewhat short of the upper end thereof. The ribs are sized to tightly engage the inner wall 35 of the housing when the brine ring is initially pressed into the housing, the insertion of which may be aided by providing the lower ends of the ribs with chamfered ends 36. The brine ring 32 is permanently secured in place by sonic welds 37 or other permanent joints at the interface between the ribs 34 and the inner wall 35.

The brine ring sleeve 33 has a smooth cylindrical inner wall 38 which engages the brine seal 17 on the filter cartridge as the latter is inserted into the housing. The outer surface of the brine ring sleeve 33 is spaced radially inwardly of the inner wall 35 of the housing by the axial ribs 34. This space defines a brine flow passage 39 as will be described in greater detail below.

With the filter cartridge 10 in place within the housing 11, the housing could be threadably connected to the mating threads on the cylindrical boss 28 of the end cap or header 30. As the threaded attachment takes place, the cylindrical neck 20 at the upper end of the cartridge is inserted into a downwardly depending cylindrical sleeve 40 formed integrally with the end cap and located concentrically within the cylindrical boss 28. The O-rings 22 engage the inner wall of the sleeve 40 and provide a liquid tight seal. Simultaneously, the upper end of the cylindrical tubular sleeve 33 forming the main body of the brine ring 32 moves into the interior of the cylindrical boss 28 and adjacent the cylindrical interior wall 41 thereof. The upper end of the brine ring sleeve 33 is provided with a pair of axially spaced annular grooves in which are seated a pair of O-ring seals 42 which sealingly engage the interior wall 41 of the boss. A large diameter O-ring 43 is seated on an annular shoulder 44 at the base of the threaded ID on the open end of the housing 11. As the threaded housing comes into full engagement with the threaded boss 28, a lower annular face 45 on the boss compresses the large diameter O-ring 43 against the shoulder 44 to provide an additional liquid seal.

When it is desired to replace the filter cartridge 10 in the assembly thus far described, the housing 11 is unscrewed from the cylindrical boss 28. However, the tight seal provided by the O-rings 22 bearing against the cylindrical sleeve 40 typically causes the filter element to hang up and remain in place as the housing is removed. As a result, after the housing has been completely unthreaded from the end cap or header 30, it must be withdrawn the full axial length of the filter cartridge 10, and then the filter cartridge removed separately by pulling it axially downward to withdraw the cylindrical neck 20 from the sleeve 40 in the header. This problem is eliminated by the use of a retaining ring 46 which operates in conjunction with the brine ring 32 to hold the filter cartridge 10 in place when the housing is removed.

Referring also to FIGS. 4–6, the retaining ring 46 has an annular cylindrical body 47 sized to slip without interference into the cylindrical inner wall 38 of the brine ring sleeve 33. The upper end of the retaining ring 46 is provided with a pair of diametrically opposed lugs 48 which extend radially outwardly. The lugs are sized to cooperate with slots 50 formed in the upper end of the cylindrical, tubular sleeve 33 of the brine ring 32. Each of the slots 50 includes an offset recess 51 at the bottom of the slot, also sized to receive a lug 48. After a new filter cartridge 10 has been inserted into the housing 11, in the manner previously described, but before the housing is threaded onto the cylindrical boss 28, the retaining ring 46 is placed around the cylindrical neck 20 on the cartridge and into the cylindrical tubular brine ring sleeve 33. The lugs 48 are caused to enter the slots 50, and, when bottomed therein, the ring 46 is turned on its axis to cause the lugs to enter the recesses 51, thereby holding the ring 46 in position. The unitary subassembly of the housing 11, filter cartridge 10, brine ring 32, and retaining ring 46 is then threaded onto the cylindrical boss 28, as previously described. When the filter cartridge is to be replaced, the housing 11 is unthreaded in a manner previously indicated. However, as the housing moves axially away from the end cap during unthreading, the underside of the retaining ring 46 comes into contact with the upper end of the filter cartridge 10 (which has not moved axially downwardly because of the tight fit of the O-rings 22). Because of the engagement of the retaining ring 46 with the upper end of the filter cartridge, further unscrewing of the housing and consequent axial downward movement will carry the filter cartridge with the housing, allowing the entire assembly to be removed as soon as the housing is completely unthreaded and without the necessity of any further downward axial movement.

The filter cartridge is removed from the housing by first removing the retaining ring 46, by turning the latter slightly on its axis and withdrawing the lugs 48 from the slots 50. To facilitate manual attachment and removal of the retaining ring, the inside surface is provided with a pair of finger tabs 52. To provide additional bearing surface for the ring and the top of the filter cartridge, the lower edge of the cylindrical body portion 47 of the ring is provided with a pair of sector shaped flats 53, as best seen in FIGS. 3 and 4.

As is shown in the drawings, in the installed position, the lower surface of the retaining ring and flats 53 are spaced slightly above the upper inlet end 23 of the cartridge. This permits a more uniform flow of incoming water to all areas of the inlet end of the cartridge 10.

In either embodiment of the foregoing arrangement, in addition to facilitating removal of the filter cartridge with the housing, the assembly also allows the use of a standard size housing 11 modified only by the addition of the brine ring 32. Instead of the lugs 48 and slots 50, the retaining ring and brine seal could be provided with mating threads to accommodate the interconnection. Referring to FIGS. 1 and 2, the three liquid flows accommodated by the assembly are all directed to the upper end thereof. This allows the use of a header arrangement 30, particularly useful in a multi-unit filter assembly of the type described in the background discussion above.

Untreated water is directed into the unit via an inlet port 54 in the header 30 which communicates directly with the open annular space between the cylindrical boss 28 and the cylindrical center sleeve 40. The untreated water flows under system pressure past the open interior of the retaining ring 46 and into the inlet end 23 of the filter cartridge. The treated water (or membrane permeate) travels downwardly and generally radially inwardly and into the center product water tube 14, from which it passes axially upwardly through the cylindrical neck 20 and out of an outlet port 55 in the header. The liquid brine (or membrane concentrate) flows downwardly and out of the brine water outlet 24 at the bottom of the cartridge. From there, the brine flows upwardly between the cylindrical side wall of the housing and the outer surface of the filter cartridge, through the brine flow passage 39 between the housing wall and the brine ring 32, into an annular slot 56 in the cylindrical boss 28, and upwardly out through a brine port 57. The header 30 is typically provided with additional overlying sealed layers which define a pattern of passages for controlling the flows to and from the various ports 54, 55 and 57.

Referring particularly to FIG. 1, it is important to note that the flow path for the brine does not have any areas of stagnant water which are not regularly flushed and in which bacteria growth may occur. The brine flow path, described in the preceding paragraph, is completely flushed by the brine flow whenever the system is operated. There are no pockets where stagnant water may accumulate and lead to the fouling problems previously described.

We claim:

1. A reversible osmosis filter assembly comprising:
   a housing including a sidewall having a radially inner surface, a closed end, an open end, and a brine ring permanently disposed within said housing and having a portion spaced apart inwardly from said radially inner surface of said sidewall to define a brine flow passage for brine therebetween;

a cover removably engaged with and closing said open end of said housing, said cover defining a purified water outlet passage and sealingly receiving said brine ring, said cover also defining an inlet passage for water to be purified and a brine outlet passage in flow communication with said brine flow passage;

a reverse osmosis cartridge disposed in said housing axially between said cover and said closed end of said housing, said cartridge having a neck sealingly received within said cover and defining an outlet communicating with said purified water outlet passage in said cover, said cartridge including a brine seal sealingly engaged with said brine ring and defining an inlet disposed between said neck and said brine seal communicating with said cover inlet passage; and a retainer removably disposed within said brine ring and axially engaging said cartridge for retaining said cartridge within said housing upon disengagement of said housing from said cover.

* * * * *